Patented June 15, 1926.

1,589,106

UNITED STATES PATENT OFFICE.

COURTLAND C. CAMPBELL, OF BOWLING GREEN, INDIANA.

MEAT WRAPPER AND PROCESS FOR MAKING SAME.

No Drawing.  Application filed August 27, 1925. Serial No. 52,957.

This invention relates to meat preserving wrappers for hams and the like, and to the process for making such wrappers; and the object of the invention is to provide a specially treated and sanitary wrapper for preserved meats of all kinds, which wrapper is designed to exclude air, water, dust and all foreign matter, and so keep the meat in first rate condition at all times.

The invention consists in taking absorbent paper and thoroughly saturating one side thereof with pyroligneous acid (liquid smoke). The reverse side of the paper is glazed or coated with any waterproofing substance, such as liquid paraffin. The paper is then dried.

The paper so prepared may be used as ordinary wrapping paper for wrapping up the meats, or the paper may be formed into sacks, as desired. For use, the waterproofed side is turned outwardly. If preferred, the waterproofing may be omitted, and both sides of the paper may be treated with the pyroligneous acid.

The pyroligneous acid at one side acts to impregnate the meat with a pleasant, pungent taste, and to drive away insects and bacteria. The paraffin at the other side acts to exclude water and dust.

I claim:

1. The process of making meat wrappers, consisting in taking paper and treating one side thereof with pyroligneous acid, and treating the opposite side with paraffin.

2. The process of making meat wrappers, consisting in taking absorbent paper and treating one side thereof with pyroligneous acid and the opposite side with some waterproofing substance.

3. As an article of manufacture, meat wrapping paper, consisting of paper treated upon one side with pyroligneous acid and upon the opposite side with some waterproofing substance.

In testimony whereof I affix my signature.

COURTLAND C. CAMPBELL.